United States Patent
Liang et al.

(10) Patent No.: US 9,035,522 B2
(45) Date of Patent: *May 19, 2015

(54) PERMANENT MAGNET MACHINE WITH DIFFERENT POLE ARC ANGLES

(71) Applicant: Ford Global Technologies, LLC, Dearborn, MI (US)

(72) Inventors: Feng Liang, Troy, MI (US); Wei Wu, Canton, MI (US); Michael W. Degner, Novi, MI (US); Franco Leonardi, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,208

(22) Filed: Aug. 26, 2013

(65) Prior Publication Data
US 2013/0342043 A1 Dec. 26, 2013

Related U.S. Application Data

(60) Division of application No. 12/882,516, filed on Sep. 15, 2010, now Pat. No. 8,536,748, which is a continuation-in-part of application No. 12/268,592, filed on Nov. 11, 2008, now abandoned.

(51) Int. Cl.
*H02K 21/12* (2006.01)
*H02K 1/27* (2006.01)
(Continued)

(52) U.S. Cl.
CPC .............. *H02K 1/276* (2013.01); *H02K 1/2773* (2013.01); *H02K 1/2766* (2013.01); *H02K 29/03* (2013.01); *H02K 2201/06* (2013.01); *Y02T 10/641* (2013.01); *Y02T 10/7077* (2013.01); *H02K 1/27* (2013.01); *B60L 11/123* (2013.01); *B60L 11/14* (2013.01)

(58) Field of Classification Search
USPC ....................................... 310/156.01–156.84
See application file for complete search history.

(56) References Cited

U.S. PATENT DOCUMENTS

| | | |
|---|---|---|
| 1,326,340 A | 12/1919 | Hellmund |
| 1,381,505 A | 6/1921 | Sandell |

(Continued)

FOREIGN PATENT DOCUMENTS

| | | |
|---|---|---|
| CN | 1933297 A | 3/2007 |
| DE | 596013 | 4/1934 |

(Continued)

OTHER PUBLICATIONS

Stumberger, Bojan, et al., Torque Ripple Reduction in Exterior-Rotor Permanent Magnet Synchronous Motor, Journal of Magnetism and Magnetic Materials, Sep. 2006, vol. 304, Issue 2, Proceedings of the 17th International Symposium on Soft Magnetic Materials, pp. 1-2.

*Primary Examiner* — Hanh Nguyen
(74) *Attorney, Agent, or Firm* — David B. Kelley; Brooks Kushman P.C.

(57) ABSTRACT

An internal permanent magnet machine has multiple rotor sections, each section having multiple rotor laminations. Permanent magnets are placed asymmetrically in lamination openings to attenuate oscillations in torque caused by harmonic components of magnetic flux. Asymmetry is achieved by placing adjacent permanent magnets or magnet sets on the rotor periphery with different rotor magnetic pole arc angles.

9 Claims, 17 Drawing Sheets

(51) Int. Cl.
  *H02K 29/03* (2006.01)
  *B60L 11/12* (2006.01)
  *B60L 11/14* (2006.01)

(56) References Cited

U.S. PATENT DOCUMENTS

| | | | |
|---|---|---|---|
| 1,723,912 | A | 8/1929 | Bergman |
| 4,508,998 | A | 4/1985 | Hahn |
| 4,713,569 | A | 12/1987 | Schwartz |
| 4,769,567 | A | 9/1988 | Kurauchi et al. |
| 5,378,953 | A | 1/1995 | Uchida et al. |
| 5,396,137 | A | 3/1995 | Shinto et al. |
| 5,610,464 | A | 3/1997 | Asano et al. |
| 5,760,520 | A | 6/1998 | Hasebe et al. |
| 5,886,440 | A | 3/1999 | Hasebe et al. |
| 6,008,559 | A | 12/1999 | Asano et al. |
| 6,127,764 | A | 10/2000 | Torok |
| 6,175,178 | B1 | 1/2001 | Tupper et al. |
| 6,285,104 | B1 | 9/2001 | Nashiki |
| 6,445,100 | B2 | 9/2002 | Tajima et al. |
| 6,653,829 | B1 | 11/2003 | Henry et al. |
| 6,727,624 | B2 | 4/2004 | Morita et al. |
| 6,774,523 | B2 | 8/2004 | Ahn et al. |
| 6,803,692 | B2 | 10/2004 | Hattori et al. |
| 6,858,968 | B2 | 2/2005 | Takita et al. |
| 6,885,162 | B2 | 4/2005 | Stridsberg |
| 7,102,263 | B2 | 9/2006 | Takano et al. |
| 7,122,930 | B2 | 10/2006 | Yamagishi et al. |
| 7,151,335 | B2 | 12/2006 | Tajima et al. |
| 7,170,209 | B2 | 1/2007 | Araki et al. |
| 7,196,445 | B2 | 3/2007 | Yamaguchi et al. |
| 7,233,089 | B2 * | 6/2007 | Matsunobu et al. ..... 310/156.45 |
| 7,342,338 | B2 | 3/2008 | Miyazaki et al. |
| 7,385,328 | B2 | 6/2008 | Melfi |
| 7,436,096 | B2 | 10/2008 | Guven et al. |
| 7,612,480 | B2 | 11/2009 | Fujii et al. |
| 8,018,109 | B2 * | 9/2011 | Leonardi et al. ......... 310/156.53 |
| 8,120,223 | B2 | 2/2012 | Leonardi et al. |
| 2002/0074887 | A1 | 6/2002 | Takano et al. |
| 2004/0017123 | A1 | 1/2004 | Miyashita et al. |
| 2004/0135454 | A1 | 7/2004 | Takahashi |
| 2004/0248443 | A1 | 12/2004 | Lai et al. |
| 2005/0023922 | A1 | 2/2005 | Araki et al. |
| 2005/0104468 | A1 | 5/2005 | Araki et al. |
| 2005/0200223 | A1 | 9/2005 | Tajima et al. |
| 2006/0197399 | A1 | 9/2006 | Kataoka et al. |
| 2007/0052313 | A1 | 3/2007 | Takahashi et al. |
| 2007/0063607 | A1 | 3/2007 | Hattori |
| 2007/0205689 | A1 | 9/2007 | Nemoto et al. |
| 2007/0210664 | A1 | 9/2007 | Matsunobu et al. |
| 2008/0224558 | A1 | 9/2008 | Ionel |
| 2008/0231135 | A1 | 9/2008 | Suzuki et al. |
| 2008/0272667 | A1 | 11/2008 | Ionel et al. |

FOREIGN PATENT DOCUMENTS

| | | |
|---|---|---|
| DE | 767611 | 1/1953 |
| DE | 69825386 | 8/2005 |
| DE | 60204705 | 5/2006 |
| DE | 112006001929 | 5/2008 |
| EP | 1217713 | 6/2002 |
| EP | 1363381 | 11/2003 |
| EP | 1430587 | 6/2004 |
| EP | 1763121 | 3/2007 |
| EP | 1973217 | 9/2008 |
| GB | 2452592 | 3/2009 |
| JP | 30033622 | 1/1991 |
| JP | 2003009440 A | 1/2003 |
| JP | 2004173375 A | 6/2004 |
| JP | 2005051982 A | 2/2005 |
| JP | 2005184957 | 7/2005 |
| JP | 2005312102 | 11/2005 |
| JP | 2011018339 A | 1/2011 |
| WO | WO03026105 | 3/2003 |

* cited by examiner

PERMANENT MAGNET MACHINE WITH DIFFERENT POLE ARC ANGLES

CROSS-REFERENCE TO RELATED APPLICATIONS

This application is divisional of application Ser. No. 12/882,516, filed Sep. 15, 2010, which is a continuation-in-part of application Ser. No. 12/268,592, filed Nov. 11, 2008, each of which is hereby incorporated by reference in its entirety.

BACKGROUND OF THE INVENTION

1. Field of the Invention

The invention relates to an interior permanent magnet machine having a rotor with multiple laminations in axially stacked relationship.

2. Background Discussion

An interior permanent magnet machine typically includes a stator with a ferrous metal core comprising stacked laminations, stator coil windings that carry excitation current and a rotor with circumferentially spaced permanent magnets on the rotor periphery that cooperate with circumferentially spaced stator poles. The stator poles are separated from the periphery of the rotor by a calibrated air gap. When the machine is acting as a motor, the coils are energized by an electrical current to provide rotor torque. The current has an alternating, multiple-phase waveform of sinusoidal shape. The interaction of an electromagnetic flux flow path created by the stator windings with the flux flow path created by the permanent magnets typically is accompanied by harmonic waveform components that induce motor torque fluctuations. Harmonic flux waveform components are created because the stator has windings contained in slots rather than in a uniform sinusoidal distribution along the inner circumference of the stator. The rotor flux also has harmonic flux because of discrete permanent magnet shapes and sizes. These features are manifested by a motor torque ripple, or torque oscillation, accompanied by vibration and noise. Further, operating efficiency of the motor is affected adversely. High order frequencies can be filtered out by the limited bandwidth of the mechanical system of a traction drive of a hybrid electric vehicle, but low frequencies will cause unacceptable oscillations.

The biggest components of the stator and rotor fluxes are called the fundamental components. In normal operation, both the stator and rotor fundamental fluxes rotate in the same direction and at the same speed, and the interaction between the stator and rotor fundamental fluxes generate rotor torque. The stator and rotor harmonic fluxes have different pole numbers, rotation speeds and directions. As a result, the interactions between rotor and stator harmonic fluxes generate torque fluctuation, which is called torque ripple. The torque ripple has different components with different frequencies. The order of a torque ripple component is defined as the ratio of the frequency of the torque ripple component to the speed of the rotor in revolution per second.

A conventional way to reduce motor torque ripple comprises skewing axially placed sections of the rotor ripple, one section with respect to the other. The rotor typically is connected drivably to a rotor shaft using a keyway and slot driving connection. In order to offset or skew a rotor section with respect to an adjacent section, the sections are relatively rotated, usually about one-half of the stator slot pitch. If it is assumed that the rotor is divided into a given number of axial sections (k), the sections are rotated with respect to adjacent sections by an angle equal to:

Skew angle $(k) = 360/(k \times N_s)$ in mechanical degrees, where $N_s$ is the number of slots.

The maximum rotation between any two axial sections of the rotor is:

Max relative skew angle $(k) = (k-1) \times 360/(k \times N_s)$ in mechanical degrees.

For example, in the case of a two section, 48 slot stator, a typical value of the skew angle is 3.75°. The skewing of the rotor is intended to produce a smoother mechanical torque than would otherwise be achieved using a straight rotor. This will eliminate certain undesirable oscillations or ripple of the torque caused by harmonics present in the air gap flux and in the air gap permeance.

For permanent magnet machines it is also common practice to skew the permanent magnets rather than the sections. However, the skewing method cannot eliminate all the torque ripple components because it cannot be designed to be effective to reduce all the torque ripple components. Another disadvantage of the skewing technique is that the average torque is also reduced, resulting in a de-rating with respect to the non-skewed design. Also, from a manufacturing perspective, skewing of either stator or rotor cores results in added complexity and cost.

SUMMARY OF THE INVENTION

An objective of the invention is to minimize a so-called torque ripple with minimal reduction in average torque. This differs from the invention of copending application Ser. No. 11/839,928, filed Aug. 16, 2007 entitled "Permanent Magnet Machine," which is assigned to the assignee of the present invention, in which an objective is to improve motor efficiency during operation in a motoring mode by using asymmetry in rotor design features of the motor while allowing an acceptable decrease in regenerative energy recovery during operation in a generating mode.

The present invention will break the symmetry of the rotor laminations, so that at a given instant the torque contributions of the multiple sections will be altered to reduce torque ripple.

Torque ripple can be attenuated by using radial skewing of the magnets. This is done by offsetting the magnetic axis of a rotor magnetic pole with respect to the axis of the adjacent rotor magnetic pole.

Rotor magnets may be arranged in sets. Each set has at least two magnets. The two magnets may be arranged in a V-shaped configuration. The shape of the torque ripple is a function of the shape of the magnet set. By using at least two different, properly designed "V" configurations in the laminations, the total machine ripple can be reduced in amplitude.

The laminations in a multiple section rotor may be arranged in at least three rotor sections, which are relatively rotated in small increments, one section with respect to the other. This can be done by using at least two pairs of key slot positions. In this way, the axis of a magnetic pole of one section is displaced angularly with respect to the pole axis of the adjacent section.

Co-pending patent application Ser. No. 12/268,592 discloses permanent magnet arrangements that reduce torque ripple. In the design of that application, a section of two poles can have permanent magnet included angles that are different, one with respect to the other.

The present invention uses a different parameter to reduce torque ripple. That parameter is pole arc angle. A pole arc angle is the angle between two radial reference lines that extend from the rotor center to tangentially spaced reference points on a magnet or a magnet set near the periphery of the rotor. The torque ripple can be significantly reduced if the pole arc angles of adjacent magnets or magnet sets are not equal to each other.

Pole arc angles for separate magnets or magnet sets are different (i.e., not equal), unlike a design in which the arc angles for adjacent magnets or magnet sets on the rotor periphery are the same. The rotor design of the disclosed embodiment of the invention will reduce the magnitude of the torque ripple while maintaining the average torque almost unchanged when compared to a conventional rotor.

BRIEF DESCRIPTION OF THE DRAWINGS

FIG. 1b is a side view of the rotor lamination; for the motor shown in FIG. 1a;

PARTICULAR DESCRIPTION OF EMBODIMENTS OF THE INVENTION

Figure 1A:
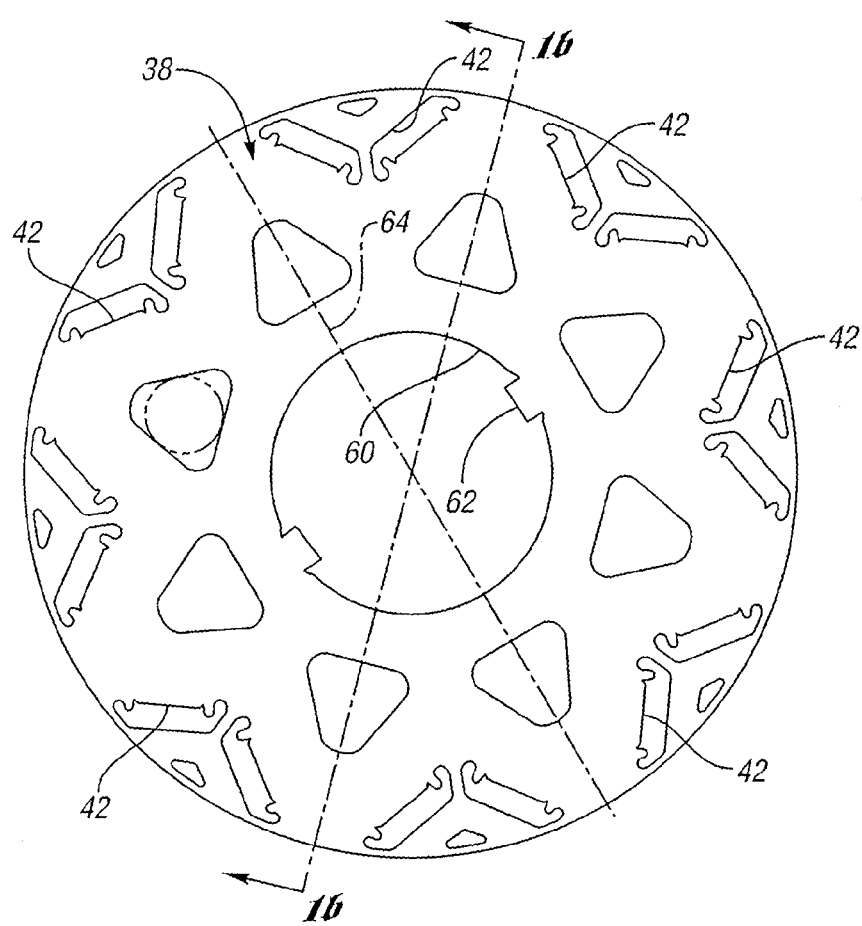
FIG. 1a is a plan view of a rotor lamination.

For the purpose of describing typical operating environments for the permanent magnet machine of the invention, reference first will be made to FIGS. 26, 27 and 28, which respectively illustrate a power-split hybrid electric vehicle powertrain, a detailed power-split hybrid electric vehicle powertrain corresponding to the powertrain of FIG. 26 and a series hybrid electric vehicle powertrain. In the case of the powertrain schematically illustrated in FIG. 28, an engine 10 is mechanically connected to a generator 12, which in turn is electrically coupled to an electric motor 14. Typically, the electrical coupling includes a DC link comprising an AC/DC inverter 16 and a DC/AC inverter 16'. A high-voltage traction battery 18 is coupled to the DC link through a DC/DC converter 20. The motor is mechanically coupled to a geared transmission mechanism 22, which may have multiple-ratio gearing or single-ratio gearing.

Traction wheels 24 are driven by torque output elements of the transmission mechanism. All of the mechanical energy of the engine, except for power losses, is transferred to the generator, which converts mechanical energy to electrical energy for driving the motor 14. Any electrical energy not required to drive the motor is used to charge the battery 18. When the vehicle is braking, all or part of the vehicle mechanical kinetic energy transferred from the transmission to the motor 14, except for losses, is used to charge the battery as the motor 14 acts as a generator.

Figure 26:
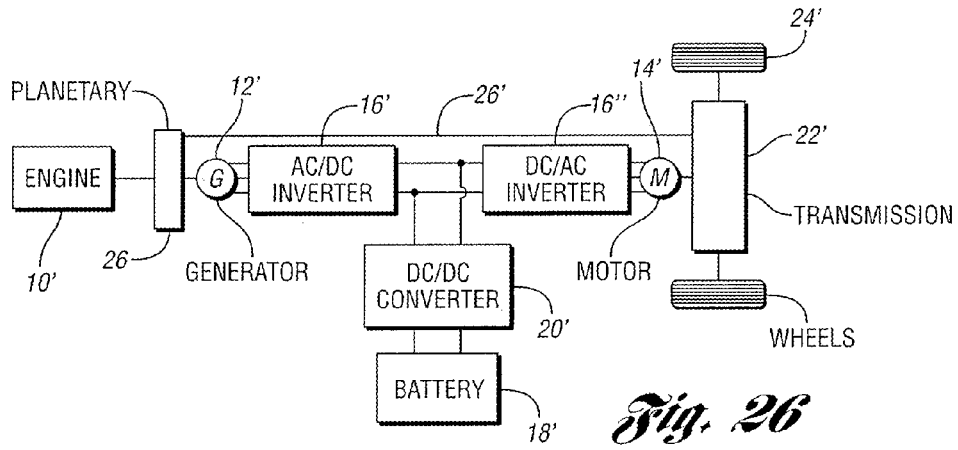
FIGS. 26, 27 and 28 show examples of hybrid electric vehicle powertrain architectures capable of using the motor of the present invention.
Figure 27:
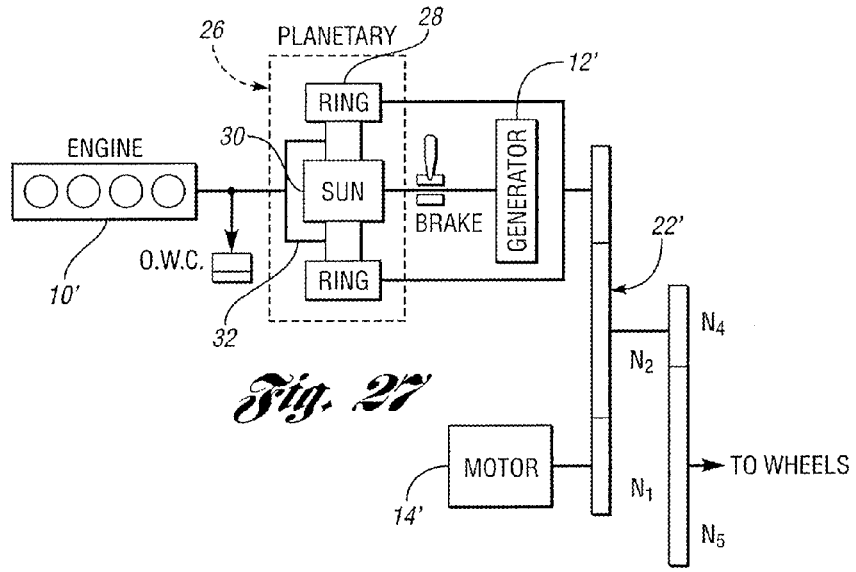
Figure 28:
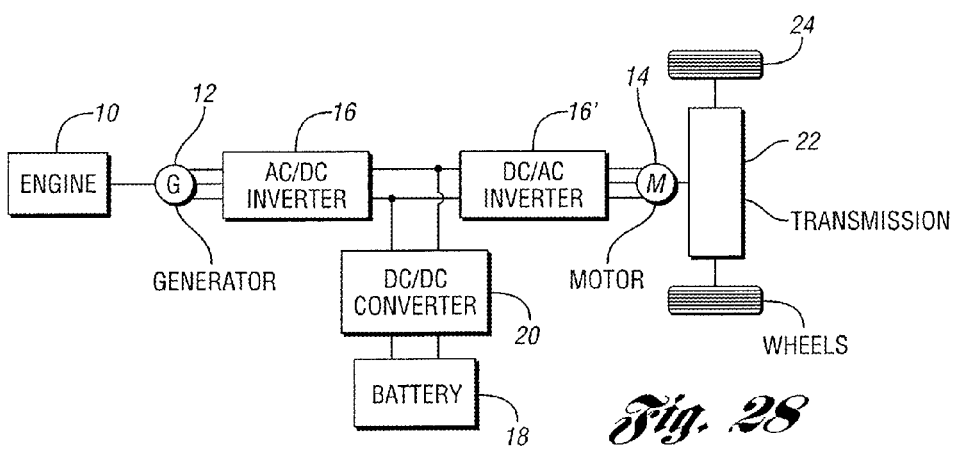

In contrast to the series arrangement of FIG. 28, the series-parallel arrangement of FIG. 26 includes a direct mechanical connection between the engine and the transmission, as shown at 26. The series-parallel gearing of the hybrid powertrain of FIG. 26 is shown in more detail in FIG. 27. Components that are counterparts for components in the series arrangement of FIG. 28 have been indicated by common reference numerals, although prime notations are added to the numerals in FIGS. 26 and 27.

The mechanical connection between the transmission 22' and the engine 10' includes a planetary gear system 26. The planetary gear system, seen in FIG. 27, includes a ring gear 28, which acts as a power output member for driving a power input element of the transmission mechanism 22'. A sun gear 30 is mechanically connected to generator 12'. The carrier for the planetary gear unit 26, shown at 32, is connected to the power output shaft or crankshaft of the engine 10'. As the engine delivers torque through the planetary gear unit 26, to the transmission. The sun gear acts as a reaction element since it is mechanically connected to the generator. The load on the generator thus will determine the speed of the engine. During forward drive, torque of motor 14' complements engine torque and provides a second power input to the transmission. During reverse drive, the torque direction of the motor 14' is changed so that it will operate in a reverse direction. The engine is inactive at this time.

When the vehicle is in a braking mode, regenerative energy is delivered from the wheels through the transmission to the motor. The motor at this time acts as a generator to charge the battery. A portion of the regenerative energy is distributed through the transmission to the engine in a mechanical torque flow path, shown in part at 26' in FIG. 26. In this respect, the regenerative energy flow path of the powertrain of FIG. 26 differs from the energy flow path for the powertrain of FIG. 28, where no mechanical energy during regenerative braking is distributed to the engine.

The rotor and the stator for the disclosed embodiments of the invention may be comprised of ferrous alloy laminations. A rotor and stator construction of this type is shown in the partial radial cross-sectional view of FIG. 1b. A stator lamination is shown at 36 in FIGS. 2a and 2b, and a rotor lamination is shown at 38. A small air gap 40, seen in FIGS. 1c and 2, is located between the inner periphery of the stator laminations 36 and the outer periphery of the rotor laminations 38. Radially extending openings 37 are formed in the stator laminations and symmetrically positioned magnet openings 42 are formed near the outer periphery of each rotor lamination 38. Each magnet opening receives a magnet 44. Any number of laminations in a given design may be used, depending on design choice. The laminations are arranged in a stack. Multiple stacks (e.g., one, two or three) may be used.

Figure 1B:
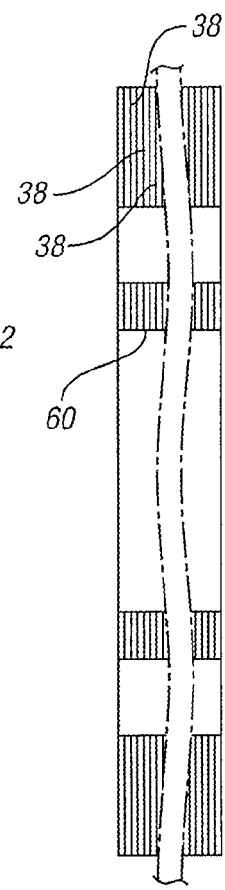
Figure 2A:
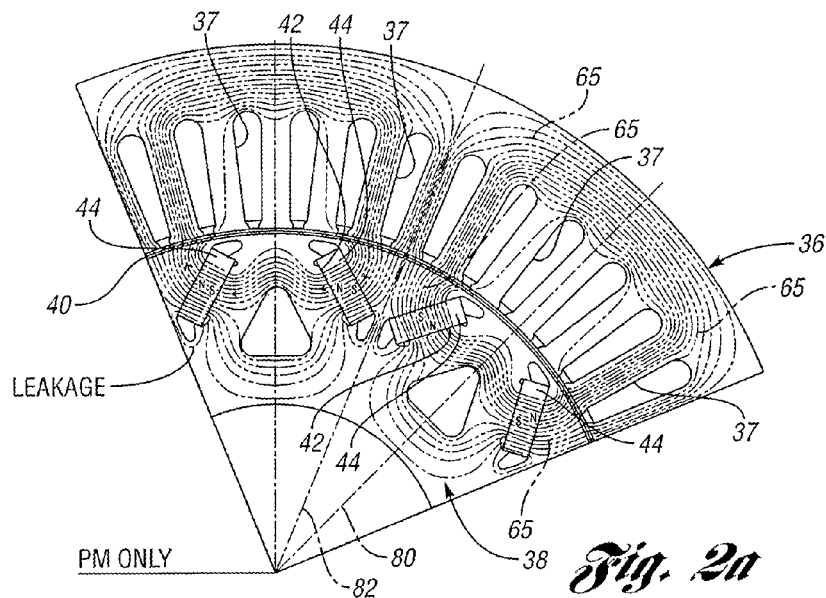
FIG. 2a is a diagrammatic view of a motor with a rotor comprised of multiple sections, each section being comprised of multiple laminations wherein flux lines are generated solely by the permanent magnet.
Figure 2B:
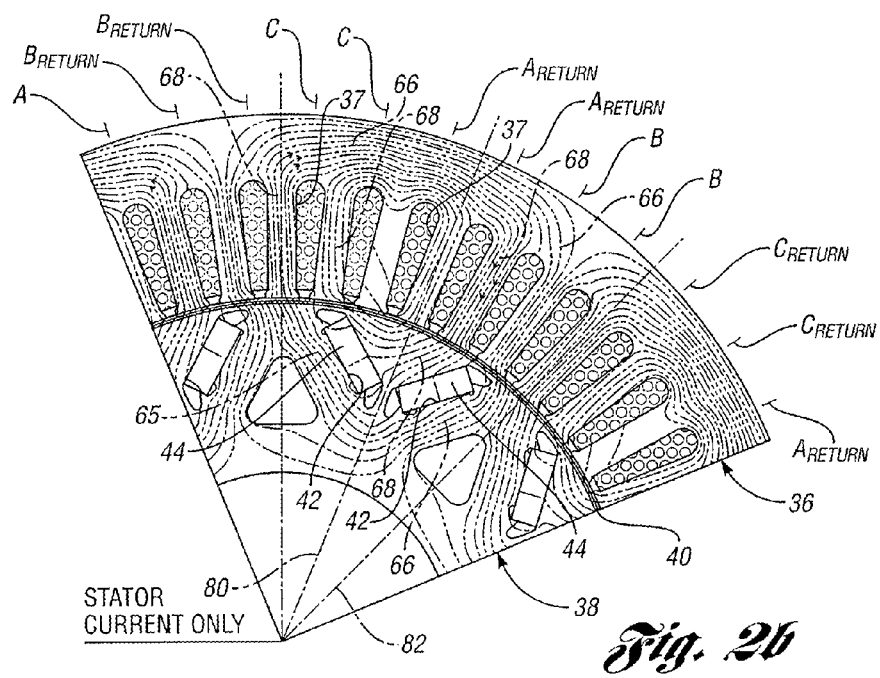
FIG. 2b is a view similar to the view of FIG. 2a wherein the stator has energized windings with electrical current, but wherein the magnets are not included, the flux lines being generated solely by the stator windings.

FIG. 1a and FIG. 1b illustrate a rotor section construction with multiple laminations arranged in stacked relationship. The magnet openings are shown in FIG. 1a, but this figure omits an illustration of the magnets.

The center of the rotor laminations has a circular central opening 60 for accommodating a driveshaft with a keyway that may receive a drive key 62.

The openings 42 are symmetrically disposed with respect to adjacent pairs of magnet openings 42, one of the axes of symmetry being shown in FIG. 1a.

FIG. 2a is a partial view of a rotor lamination 38. The stator 36 has stator windings in the openings 37, but they are not illustrated in FIG. 2a because it is assumed that in the case of FIG. 2a, the stator windings do not carry electrical current. The stator windings with current, however, are shown in FIG. 2b.

A magnetic rotor flux flow path is shown at 65 in FIG. 2a. A magnetic stator flux flow path is shown at 65 and 66 in FIG. 2b. The rotor flux and the stator flux interact, as shown in part at 68, to develop rotor torque in known fashion.

Figure 3:
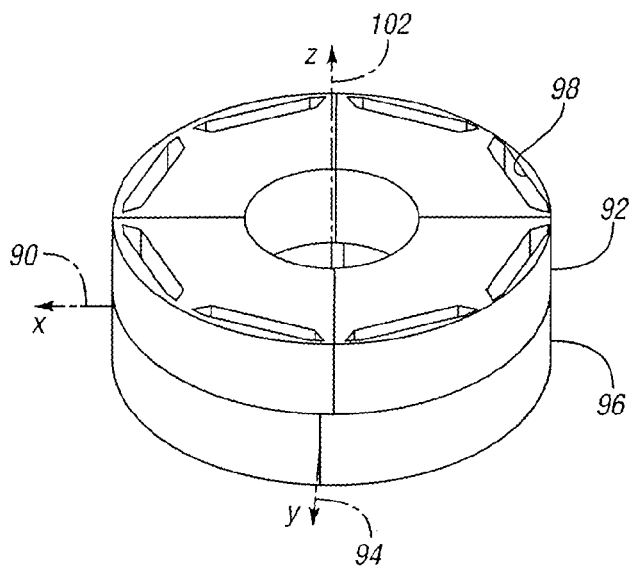
FIG. 3 is a schematic representation of a prior art two-section rotor in which the sections are skewed, one with respect to the other, according to a known skewing technique.

A known way to reduce motor torque ripple is to skew the sections of the rotor, one with respect to the other, by offsetting one half of the rotor lamination stack with respect to the other half. This is seen in FIG. 3, where the X-axis 90 for rotor section 92 is skewed relative to the Y-axis shown at 94 for an adjacent rotor section 96. The amount of rotation of one section relative to the other is usually one half of the stator key or slot pitch. This is expressed as follows:

skew angle=$180°/N_s$ in mechanical degrees, where $N_s$ is the number of slots.

Magnet openings in rotor section 92 are shown at 98. The magnet openings are evenly spaced in the case of the rotor of FIG. 3. Magnet openings similar to openings 98 are located in rotor section 96. The rotor spacing about the Z-axis 102 in FIG. 3 is uniform. Reference may be made to U.S. Pat. No. 7,170,209 for an illustration of a motor rotor with skewed rotor sections.

Magnet openings in the rotors of the embodiments of the invention that are disclosed need not be shaped as shown in the figures of the drawings. The shape of the magnet openings is a design choice.

Figure 4:
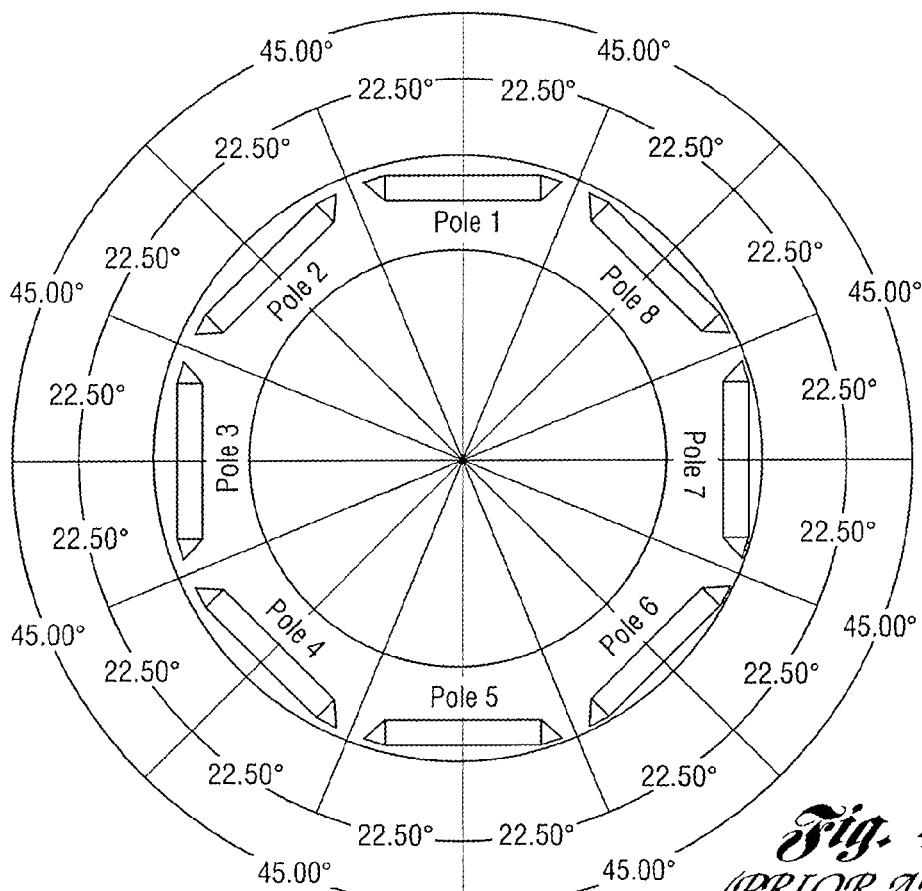
FIG. 4 shows a symmetric lamination for a prior art eight pole rotor design for use in the electric motor rotor seen in FIG. 3.

FIG. 4 shows a plan view of a typical lamination for the sections illustrated in FIG. 3. As in the case of FIG. 2, rotor sections having laminations of the type shown in FIG. 4 may include a key-and-slot connection with a rotor driveshaft, although the key-and-slot connection is not shown in FIG. 4.

The rotor design having sections, as illustrated in FIG. 4, is divided into a generic number of axial sections K, each section being rotated with respect to an adjacent section by an angle equal to:

skew angle(k)=$360/(k*N_s)$ in mechanical degrees, where $N_s$ is the number of slots, The maximum rotation between any two axial sections of the rotor is:

max relative skew angle(k)=$(k-1)*360/(k*N_s)$ in mechanical degrees.

The magnet poles are located as shown in FIG. 4. The angle between the magnetic axes of adjacent poles is 45° for an eight pole design. The angle between the magnetic axes and the interpolar axes is one half of the angle between the magnetic axes of adjacent poles for an eight pole design.

The disclosed embodiments of the invention have eight magnetic poles, but the scope of the invention is not limited to the use of eight magnetic poles. The number of poles used is a matter of design choice.

Figure 5:
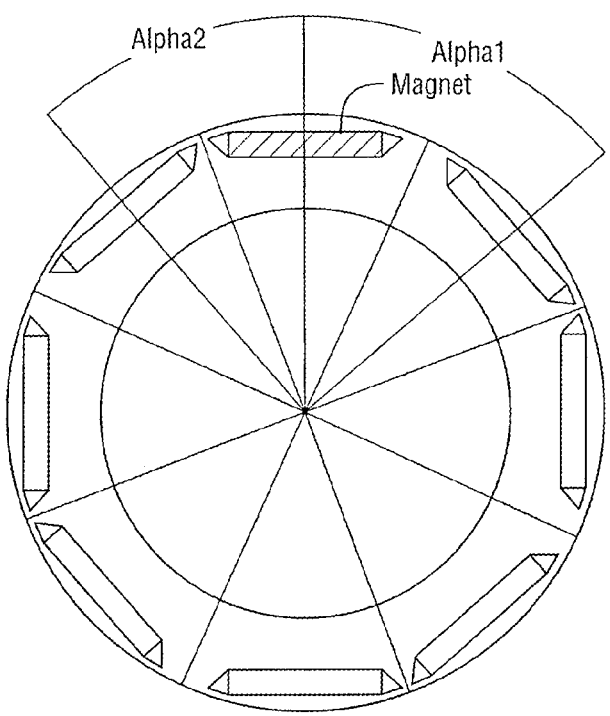
FIG. 5 shows a rotor lamination with a magnetic axis skewing arrangement.

A first embodiment of the invention is shown in FIG. 5, where a rotor lamination has poles that are radially skewed. The skewing is realized within each lamination itself by offsetting the magnetic axis of a magnet pole with respect to an adjacent pole.

Manufacture of the rotor is simplified by the absence of several steps usually needed to create multiple, axially-stacked rotor sections. This manufacturing method is especially valuable in the case of an integrated starter-generator type motor, where the stacked length of the sections is normally short and the known skewing method described with reference to FIG. 3 is not feasible. The embodiment of the invention, however, is not limited to short stack motors and generators, but it can be applied to any permanent magnet machine. It can exceed the performance of an electric machine with known skewing and it may be made using simpler manufacturing processes. The performance improvement is due to a further reduction of the torque ripple previously described. Further, the embodiment of the invention of FIG. 5 is not limited by the number of axial segments in the rotor design. It has as many pole-spacing possibilities as the number of rotor poles.

In the design of FIG. 5, the spacing between the axis of symmetry of two adjacent magnets is not constant. It can be either one of two values:

i.e., $\text{Alpha}_1 = 360/\text{poles} + \text{skew angle}$;

or $\text{Alpha}_2 = 360/\text{poles} - \text{skew angle}$.

Figure 6:
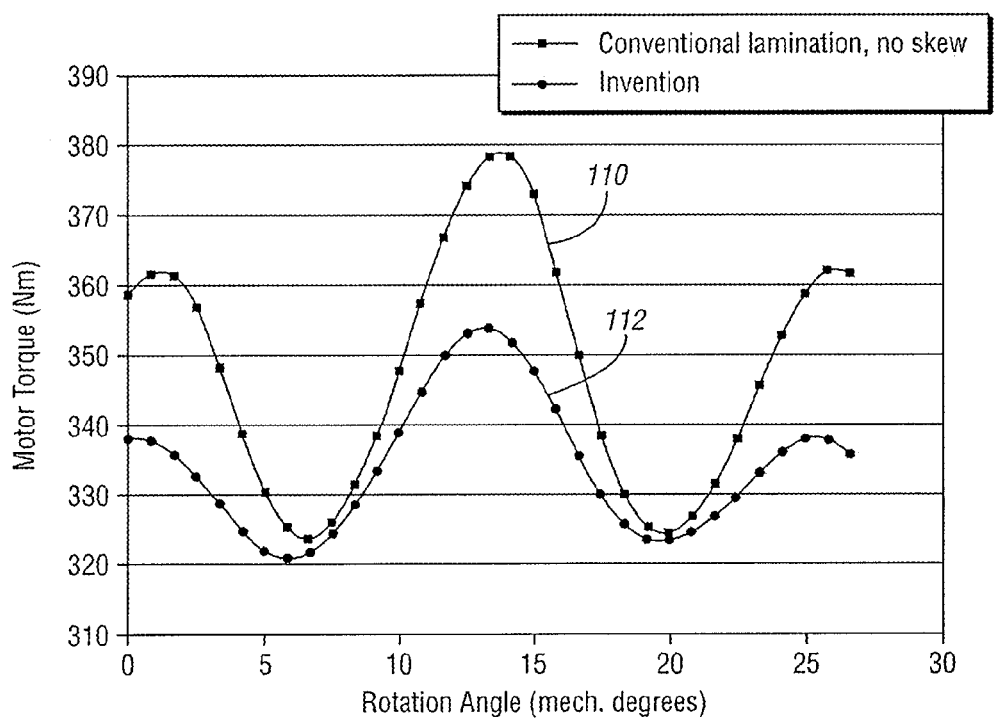
FIG. 6 is a plot of rotor rotation angle in mechanical degrees versus motor torque in Newton meters showing the effect on motor instantaneous torque using the magnet arrangement of FIG. 5.

For an eight pole, 48-slot motor and a skew angle of 3.75°, Alpha1 and Alpha2 are 48.75 and 41.25 mechanical degrees, respectively. Other values of skew angle can be chosen according to design choice. The effect of this magnet arrangement on the motor torque for a typical inner permanent magnet machine is shown in FIG. 6. A typical rotor torque ripple plot for a non-skewed rotor is shown at 110 in FIG. 6 and a corresponding rotor torque ripple plot for a skewed rotor, according to the invention, is shown at 112. The amplitude of the ripple of plot 112 is significantly lower than the amplitude of plot 110.

Figure 7:
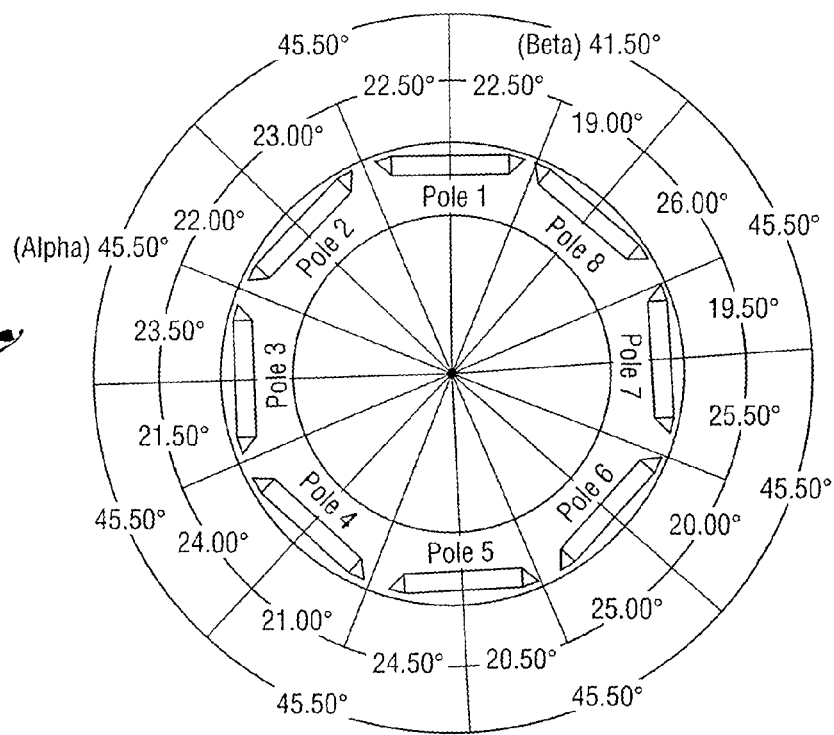
FIG. 7 is a view of a continuous skewing arrangement that may be used rather than the skewing arrangement of FIG. 5.

This rotor design is also suitable for other arrangements for the rotor poles, such as the one shown in FIG. 7, where poles 1-8 are separated by an angle alpha=45+skew angle/7, and poles 8 and 1 are separated by angle beta=45−skew angle. In contrast, for the design shown in FIG. 5, the skew angle is arbitrarily set to be equal to 3.5°, alpha=45.5° and beta=41.5°.

Figure 8:
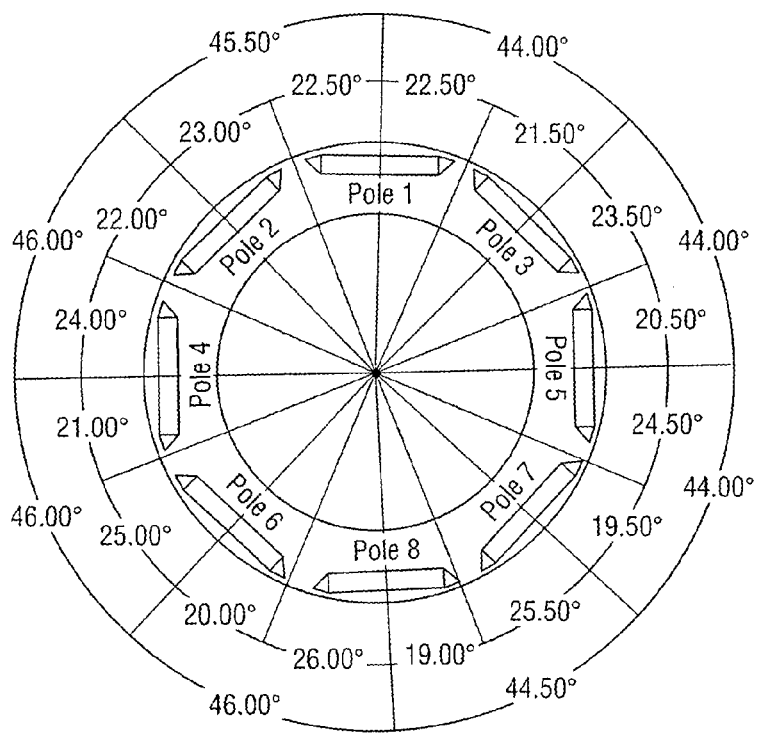
FIG. 8 is an illustration of a magnet distribution that has a different separation between the interpolar axes compared to the interpolar axes separation of FIGS. 5 and 7.

An effect on torque ripple, similar to the effect on torque ripple for the design of FIG. 5, can be obtained by the distribution pattern for the magnets seen in FIG. 8. In FIG. 8, for any given pole, the offset with respect to the original magnetic axis remains the same as the one shown in FIG. 7 (i.e., pole number 2 has a magnetic axis that is displaced 22.00° from one interpolar axis and 23° from the adjacent interpolar axis), but pole number 3 has taken the place of pole number 8, and pole number 4 has been moved to the location of pole number 3, etc. This distribution has a more uniform spacing between the poles than in the case of the design of FIG. 7.

Figure 9:
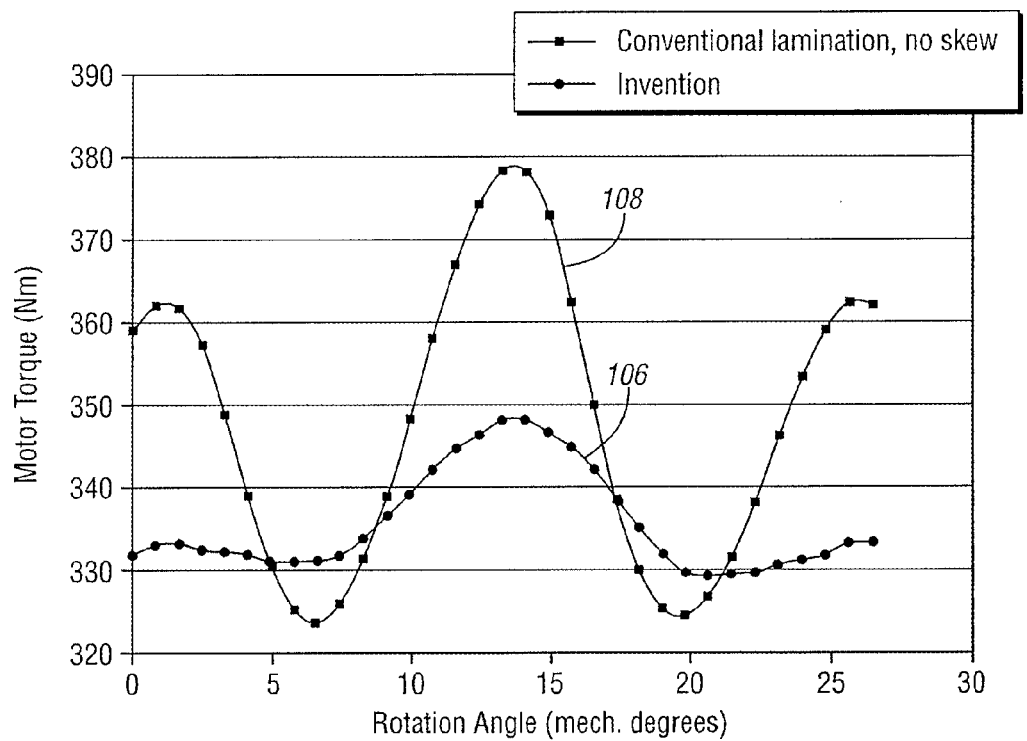
FIG. 9 is a plot of motor torque versus rotation angle in mechanical degrees for the rotor design illustrated in FIG. 8.

A plot of the motor torque versus rotation angle for the design of FIG. 8 is seen in FIG. 9. The torque ripple seen in FIG. 9 is identified by numeral 106. For purposes of comparison, the torque ripple for a rotor having sections using the known design with no skew is shown at 108.

A plot of motor torque versus rotation angle for the design of FIG. 5, as previously mentioned, is seen in FIG. 6 where a conventional design with no skew is plotted at 110 and the plot corresponding to the design of FIG. 5 is shown at 112. The amplitude of the ripple seen at 106 in FIG. 9 has a lower amplitude than the amplitude seen at 112 in FIG. 6 for the design of FIG. 5.

The invention is not limited to the use of flat magnets. It may have "V" shape magnets or other shapes.

Figure 10:
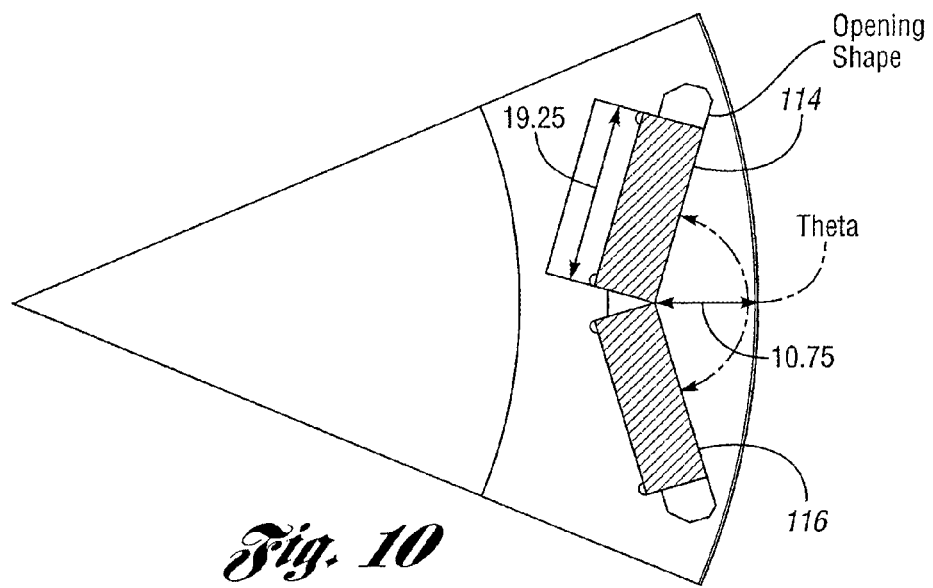
FIG. 10 shows a rotor configuration of a permanent magnet motor together with some of the variables that can be used to manipulate the harmonic content of the motor torque.

FIG. 10 shows a magnet configuration in which the rotor magnets, seen at 114 and 116, are arranged in a "V" shape. In the case of the design of FIG. 10, the shape and the amplitude of the torque ripple is a function of the shape and amplitude of the angle theta between the magnets 114 and 116. Parameters that affect this shape and the magnitude of each are identified in FIG. 10, where the width of each magnet may be 19.25 mm and the distance between a point of engagement of the magnets 114 and 116 and the air gap may be 10.75 mm. The specific parameters, of course, can be different than those illustrated in FIG. 10.

Figure 11:
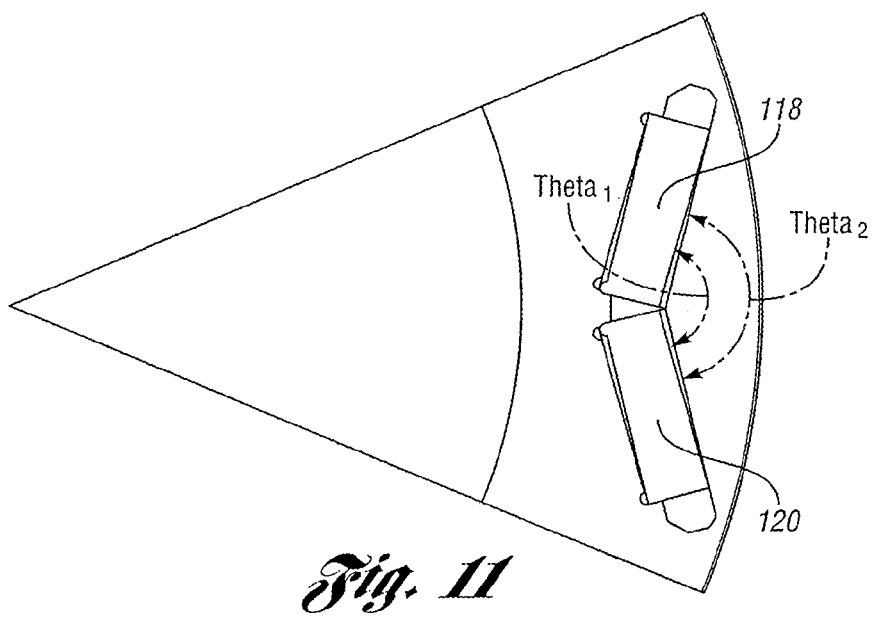
FIG. 11 is a view of a portion of a laminated rotor with two angular positions of the magnets for adjacent rotor sections.

FIG. 11 shows how the angle theta is adjusted to obtain smoother torque production. Although the average values for the torque will not be greatly affected, the harmonic components of the torque can be manipulated by properly designing the different "V" shapes. For purposes of illustration, magnets 118 and 120 for laminations of one section are shown overlapped with respect to magnets for laminations of an adjacent section. Magnets 118 and 120 for one section are separated by an angle $\text{theta}_1$, whereas the angle for an adjacent section is $\text{theta}_2$. Further, the length and width of magnets of one section may differ from the shape, length and width of magnets of another section.

In addition to the implementation of the invention seen in FIG. 11, the multiple magnetic poles on the rotor can be designed with at least two different arrangements. For example, the eight pole rotor of FIG. 12 may have poles 1, 3, 5, and 7 of laminations of one section arranged according to the design of FIG. 11, in which the angle is $\text{theta}_1$, and the other four poles may have a design in which the angle is $\text{theta}_2$. Further, to avoid low frequency torque oscillations, the rotor can be divided into two axial segments for the design shown in FIG. 11, which are rotated with respect to each other, so that poles 1, 3, 5 and 7 of one section of the rotor are aligned with poles 2, 4, 6 and 8 of an adjacent section. This arrangement is shown in FIG. 13, where the magnetic axis of a set of poles A for one section is aligned with the axis of a set of magnetic poles B for an adjacent section.

Figure 12:
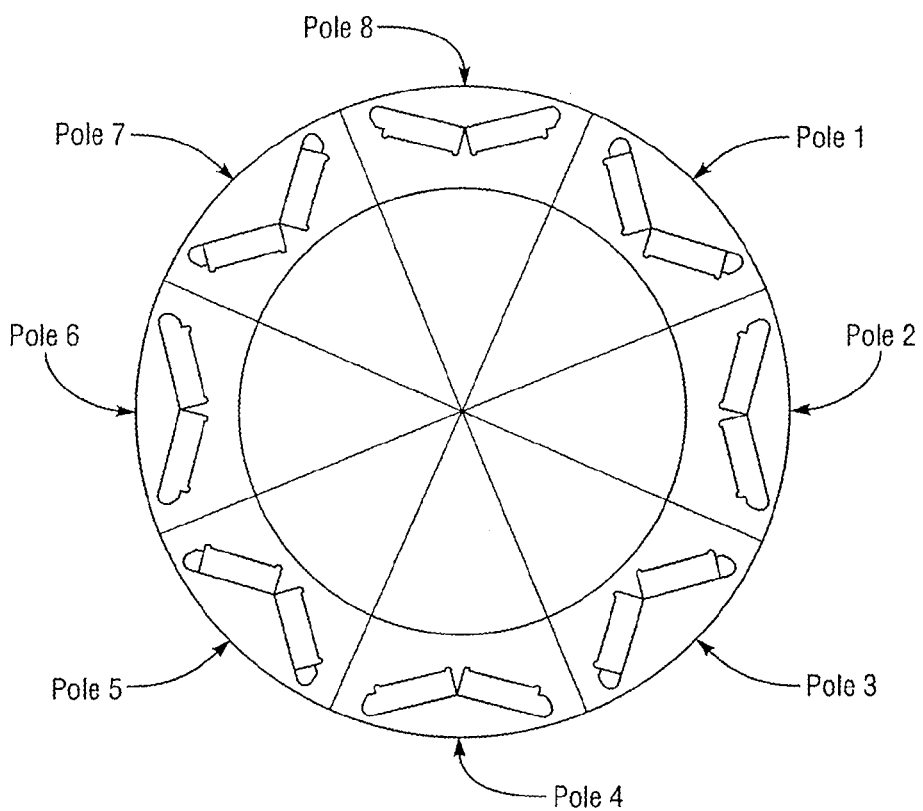
FIG. 12 shows a view of a laminated rotor in which adjacent magnets are arranged with a different angle theta at alternate rotor locations.
Figure 13:
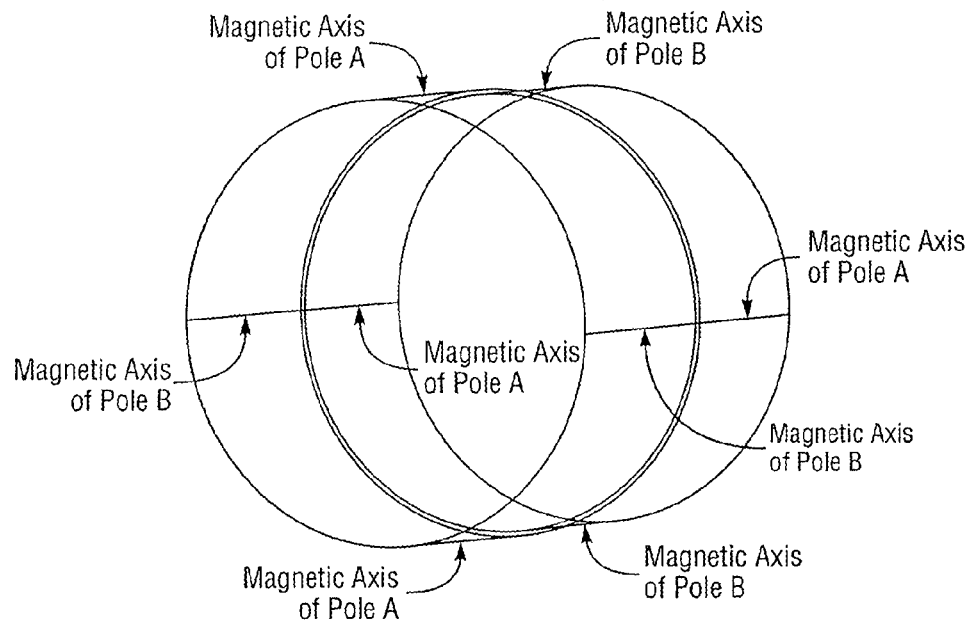
FIG. 13 is a schematic representation in three-dimensional form showing the axial alignment of the magnetic poles in a four pole structure.

The concept illustrated in FIG. 13 can be extended to include rotor configurations that are different from the "V" shaped configuration seen in FIGS. 11 and 12. For example, pole type A in FIG. 13 could include "V" shaped magnets and pole type B could be flat or surface mounted magnets, as in the case of FIGS. 5, 7 and 8. The torque harmonics can be manipulated in this fashion to create an attenuated total torque ripple. Further, more than two types of magnet configurations can be used, and variations can be made in the proximity of the magnets to the air gap to manipulate torque harmonics.

A third embodiment of the invention makes it possible to form the laminations of multiple axial sections in a manufacturing process using a single rotor lamination stamping die in order to avoid multiple lamination types in the same rotor.

Figure 14:
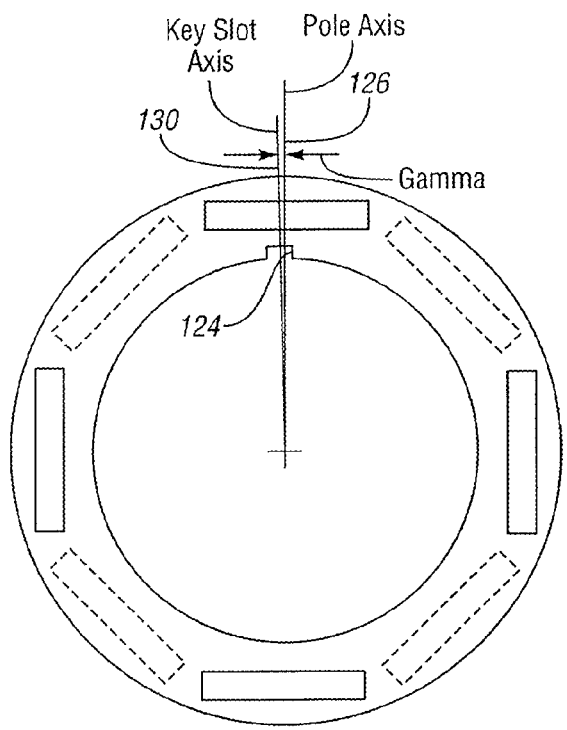
FIG. 14 shows a skewing of rotor laminations of a permanent magnet rotor of the type shown in FIG. 3.
Figure 15:
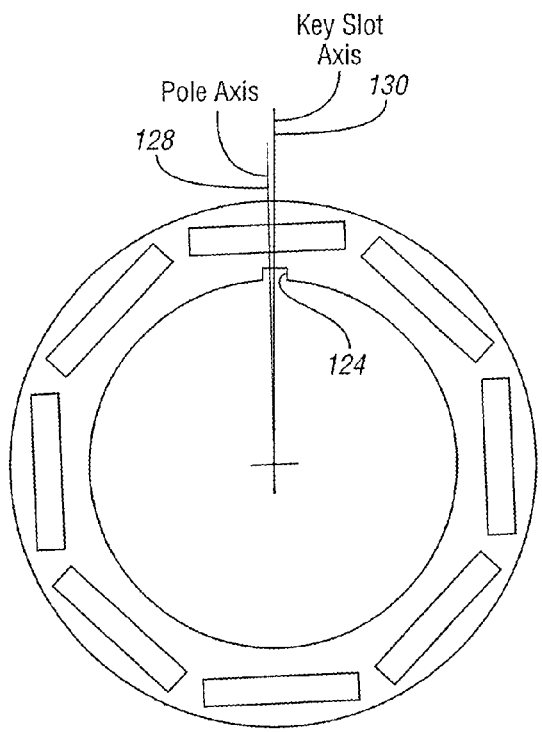
FIG. 15 shows the effect of flipping a second section of a rotor with respect to a first section.

FIG. 14 shows a skewing arrangement for a permanent magnet motor using a single lamination type where the first section of the rotor is assembled by stacking half of the rotor laminations and inserting the magnets in their magnet openings. The laminations have a key slot 124, where key slot axis 130 is rotated with respect to the nearest pole axis 126 by a certain angle. To create the second section of the rotor, the rest of the laminations are flipped around axis 130, as shown in FIGS. 14 and 15. Because of the flip, the pole axis shown at 126 in FIG. 14 becomes pole axis 128 in FIG. 15 and is rotated by Gamma with respect to axis 130 in the counter-clockwise direction. The optimum angle would be determined based on the harmonic content of the air gap flux and the air gap permeance. When the two rotor sections are aligned using the key slot as the common aligning device, the pole axes of the two rotor sections are displaced by 2×Gamma with respect to each other.

Figure 16:
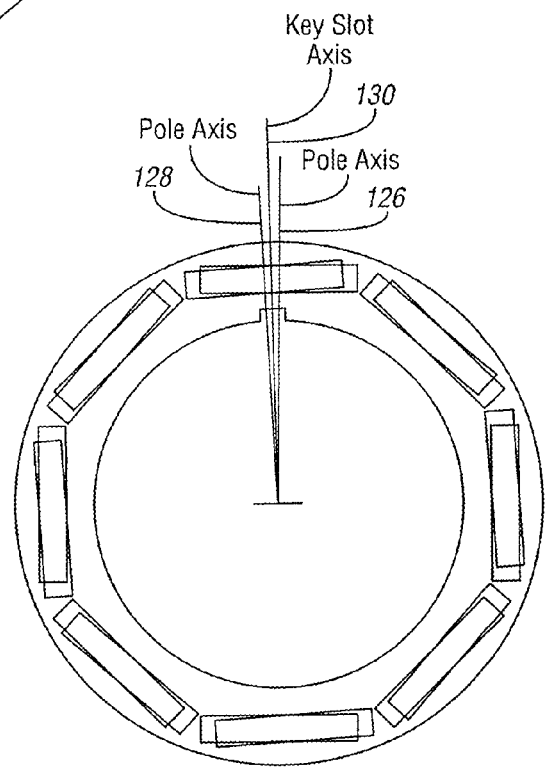
FIG. 16 is an illustration of a final skewing technique after adjacent sections of the rotor have been aligned along a key slot for the sections shown in FIGS. 14 and 15.
Figure 17:
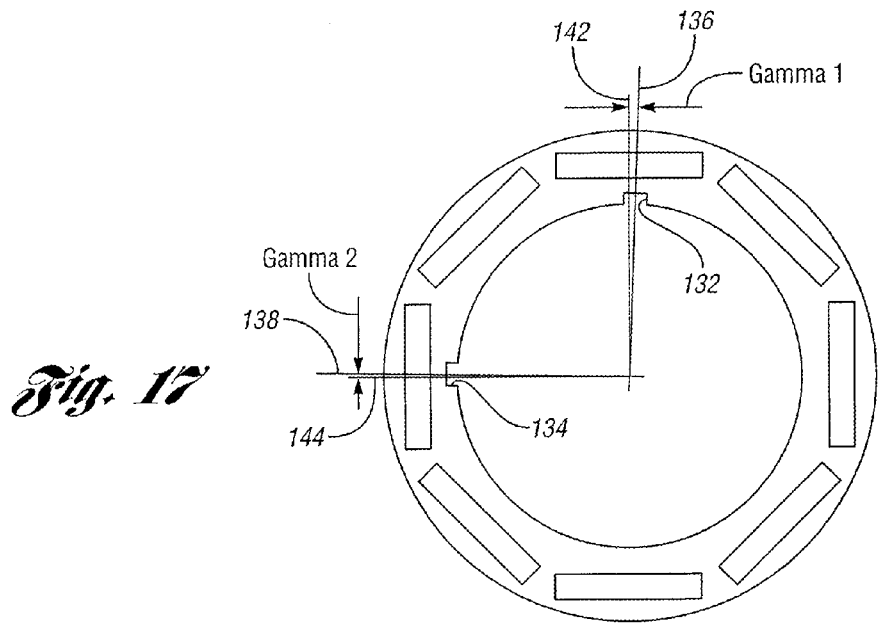
FIG. 17 is an illustration of an embodiment of the invention wherein two key slots are placed relative to each other at approximately 90° to allow construction of a four-section rotor.

Performance of the rotor shown in FIG. 16 can be improved to approximate a continuous skewing effect by increasing the number of rotor sections and rotating them in smaller incremental steps. The present invention is aimed at accomplishing this task using a single lamination die. This is illustrated in FIG. 17, which shows laminations with a first key slot at 132 and a second key slot at 134. The key axis for slot 132 is shown at 136, and the key axis for slot 134 is shown at 138.

Figure 18:
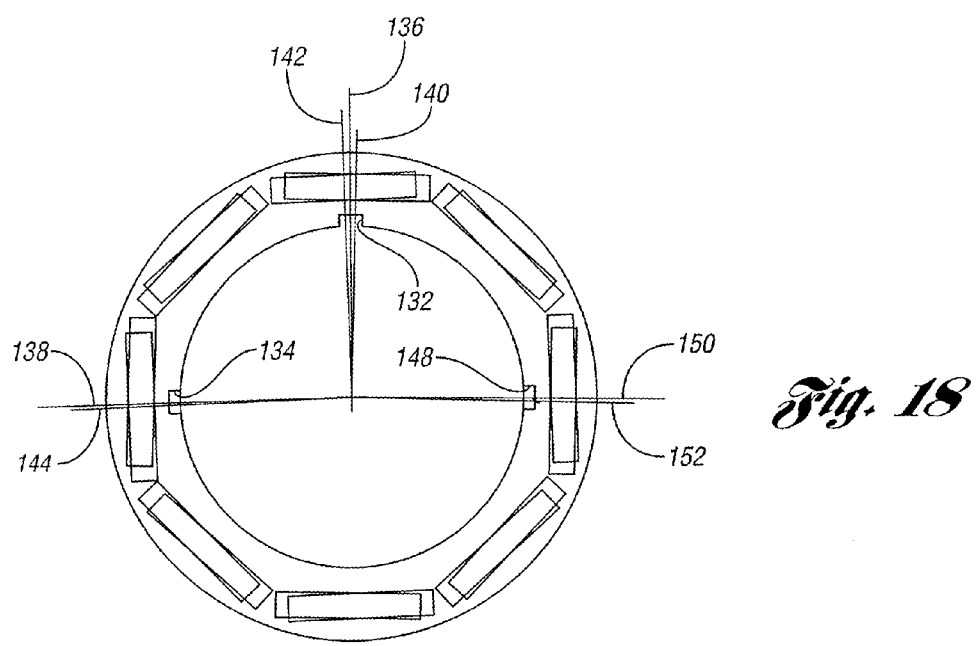
FIG. 18 is a view similar to FIG. 17, but which illustrates the first two sections of a four section rotor.

The first section of the rotor is obtained by axial stacking one quarter of the rotor laminations and then aligning them along the first key slot. The second section is similarly made by flipping the laminations and stacking them, as in the design of FIGS. 14-16. This will result in the partial assembly shown in FIG. 18, which illustrates the first two stages of a four section rotor. The angle formed by 136 (Gamma1) and the nearest pole axis 142 is different from the angle 138 (Gamma2) and the nearest pole axis 144. The magnetic axes shown at 140 and 142 in FIG. 18 in one example of the invention are separated by 2×Gamma1. The key slot axis is shown at 136 for the slot 132.

The included angle created by the intersection of axes 136 and 138 for key slots 132 and 134, respectively, may be referred to as angle Delta, expressed as:

Delta=N*360/P+2Gamma1, where P is the number of poles, and N is any number in the number set of 1, 2, 3, . . . P−1.

Figure 19:
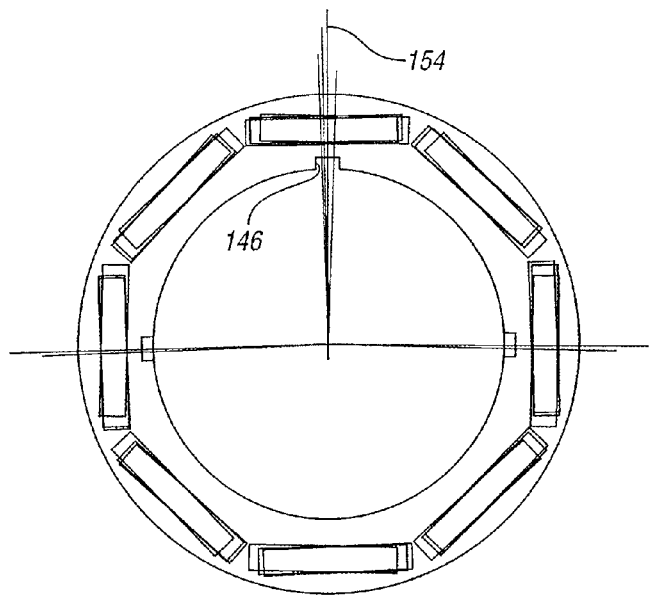
FIG. 19 is a combined view of the rotor sections of FIGS. 17 and 18.
Figure 20:
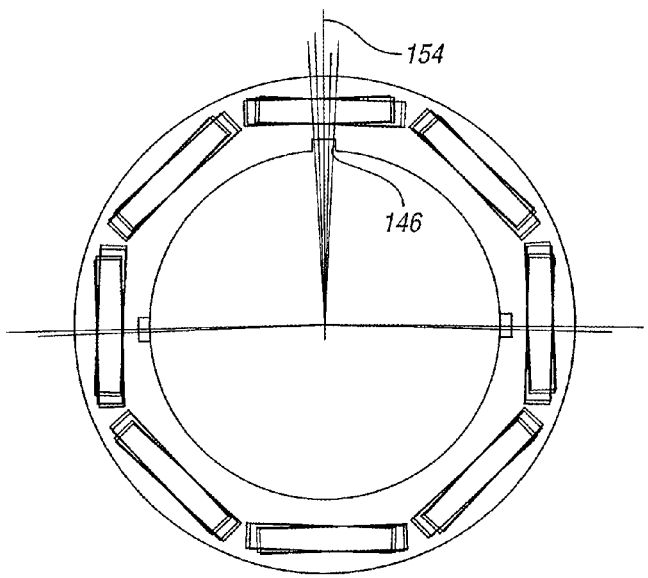
FIG. 20 is an illustration of the final assembly of the four sections of FIGS. 17-19.

In FIG. 19, the third section of the rotor assembly for the third embodiment of the invention is created from the non-flipped laminations, as in the case of the first section, but it is rotated to the angle Delta clockwise so that it is aligned with the first two sections using the second key slot 134. In FIG. 19, numeral 154 designates the key slot axis. The third section in the design of FIG. 19 is offset by theta2−theta1 from the first section. FIG. 20 shows the final assembly of all four sections.

Figure 21:
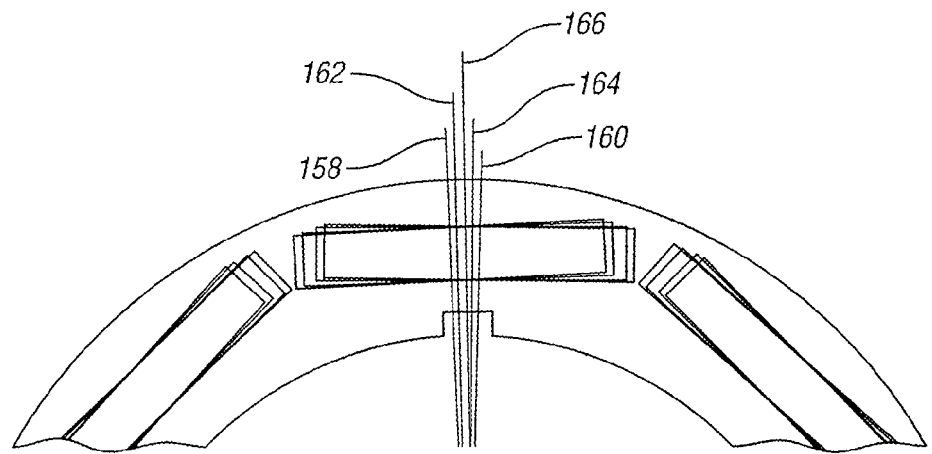
FIG. 21 is an enlarged view of the final assembly of the four sections seen in FIG. 20.

FIG. 21 is an enlargement of a portion of the four sections illustrated in FIG. 20. It shows the axis of the magnetic poles of the different sections relative to the key slot axes.

The fourth section of FIGS. 20 and 21 is created from flipped laminations, which are rotated counter-clockwise by the angle delta and aligned on the second key slot. The resulting structure shown in FIGS. 20 and 21 has four sections, which have the following rotations with respect to the shaft key: The first is shown at 158, which is rotated theta$_1$ in a counter-clockwise direction; the second section shown at 160 is rotated theta$_1$ in a clockwise direction; the third section shown at 162 is rotated theta$_2$ in a counter-clockwise direction; and the fourth section shown at 164 is rotated theta$_2$ in a clockwise direction. The key slot axis is shown at 166.

It is possible with this embodiment of the invention to arrange the laminations so that the second key slot is aligned with the magnet axis. In this case, the third and fourth rotor sections will have zero rotation and a balanced symmetrical three section rotor thus becomes possible.

Figure 22:
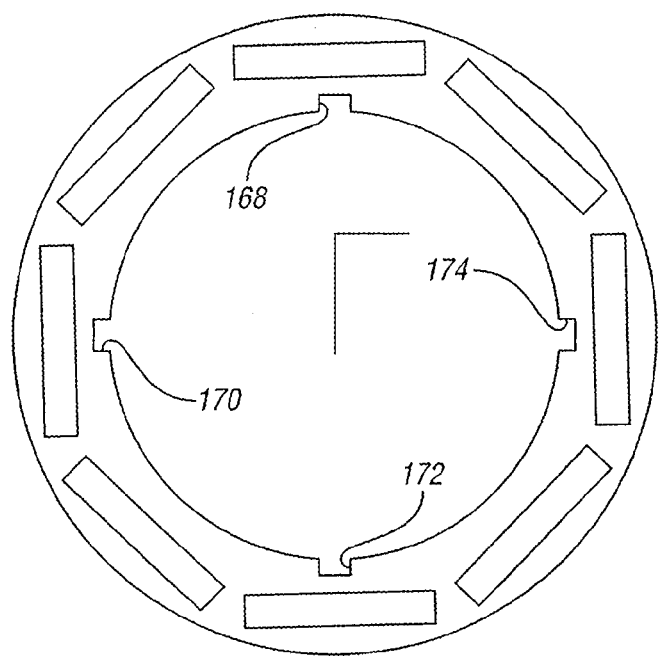
FIG. 22 is a view similar to the views of FIGS. 18-21 with key slots to improve balancing.
Figure 23:
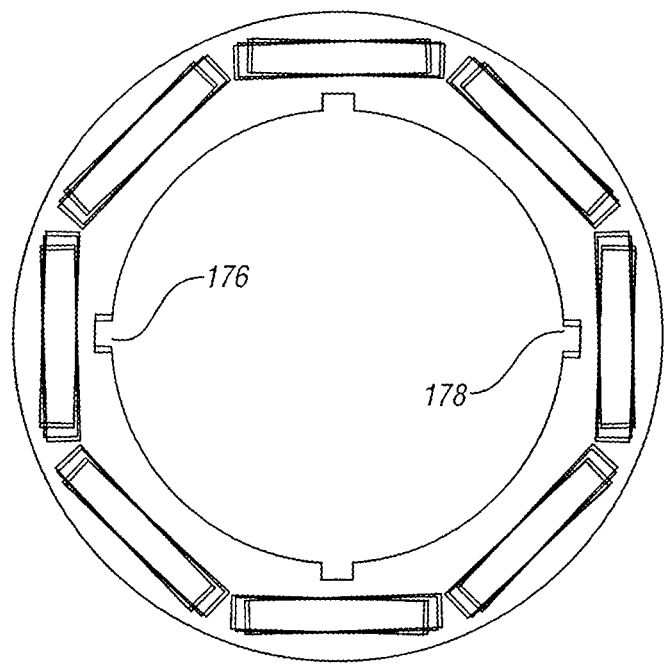
FIG. 23 is a final assembly view of the rotor laminations shown in FIG. 22.

Rotor balancing can be improved in the design of the third embodiment with the adoption of a second set of key slots placed at 180° from the other two, as illustrated in FIG. 22, where key slots 168 and 170 are spaced 180°, respectively, from key slots 172 and 174. Following the procedure described previously with respect to FIG. 21, the resulting design is illustrated in FIG. 23 where two keys are used to secure the rotor to the rotor shaft to achieve improved rotor balance. This is seen at 176 and 178 in FIG. 23.

Figure 24:
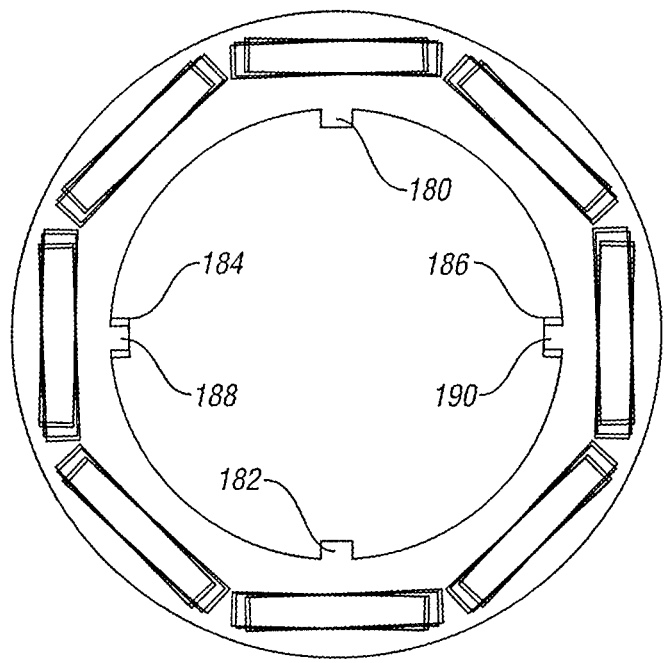
FIG. 24 is a view of a rotor design seen in FIG. 23, but which is provided with built-in keys instead of key slots.

It is possible in the case of the configuration according to the third embodiment of the invention to use a pole number count other than a pole count of eight. A four pole rotor can be treated in the same way as a rotor with a pole count of eight poles. Also, the assembly technique can be applied to rotors that do not use a key slot, but rather use a tab or other alignment device, such as a cleat. Further, built-in keys can be used as illustrated in FIG. 24. In the case of the design of FIG. 24, the rotor shaft will have two key slots 180 and 182 that are as wide as the keys, and two larger key slots 184 and 186 that accommodate a misalignment of the keys, shown at 188 and 190, respectively.

Figure 25:
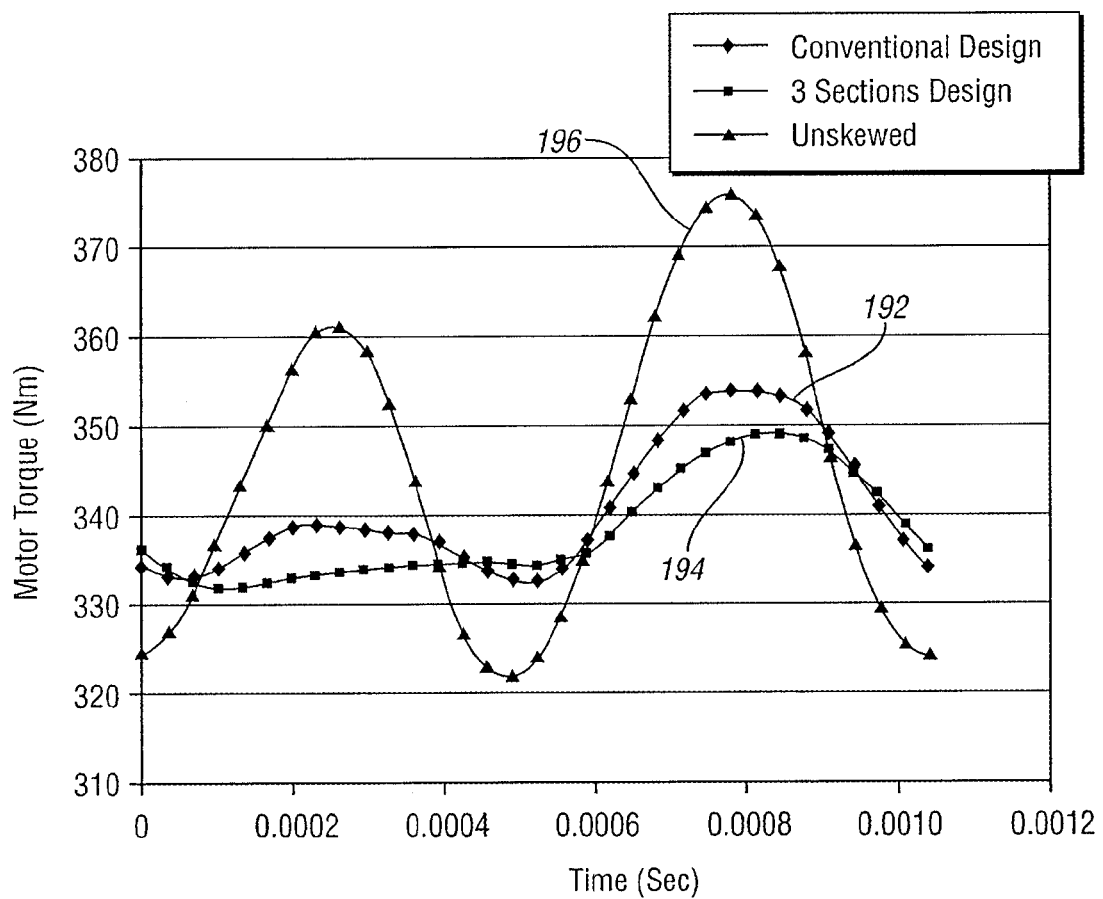
FIG. 25 is a plot showing a reduction in torque ripple for a conventional skewed design for the present invention and for a rotor that is unskewed.

FIG. 25 is a plot of torque ripple obtained by the embodiments of the invention using a finite element simulation technique. A conventional method of skewing will result in a ripple plot as shown at 192. A plot using three lamination sections according to the present invention is shown at 194. For purposes of comparison, an unskewed rotor plot is shown at 196.

Figure 29:
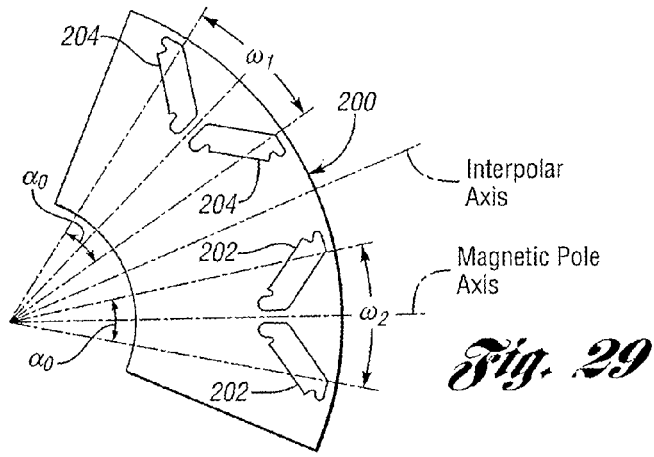
FIG. 29 is a cross-sectional planar view of a two-pole section of a permanent magnetic motor in accordance with the disclosure of co-pending application Ser. No. 12/268,592.

FIG. 29 shows a two-pole section 200 of an internal permanent magnet rotor of the kind disclosed in copending application Ser. No. 12/268,592. In the FIG. 29 design, all the poles have the same pole arc angle α. The magnet openings 202 and 204 are arranged in adjacent pairs. The magnet opening 202 of one pair define a "V" shape pattern with an included angle $\omega_2$. The magnet opening 204 of an adjacent pair define a "V" shape with an included angle $\omega_1$. An arc angle α between the magnets of one pair is equal to the arc angle α between the magnets of an adjacent pair.

Figure 30:
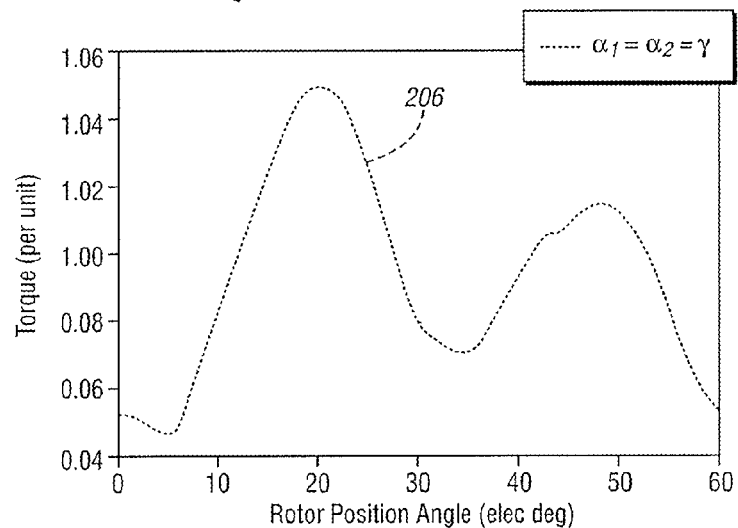
FIG. 30 is a plot showing a torque profile of a conventional design with equal pole arc angles.

FIG. 30 shows the torque profile of a conventional design, where all the magnet poles have the same pole arc angle α. As can be seen in FIG. 30, the torque ripple is high, as shown at 206. The torque ripple is changed as the pole arc angle is changed. The profile for one arc angle is seen at 206. A profile for another arc angle is seen at 208 in FIG. 32. It can be observed in FIG. 31 that the two torque profiles are almost out of phase. The torque ripples for one profile essentially cancel the torque ripples for the other profile.

Figure 32:
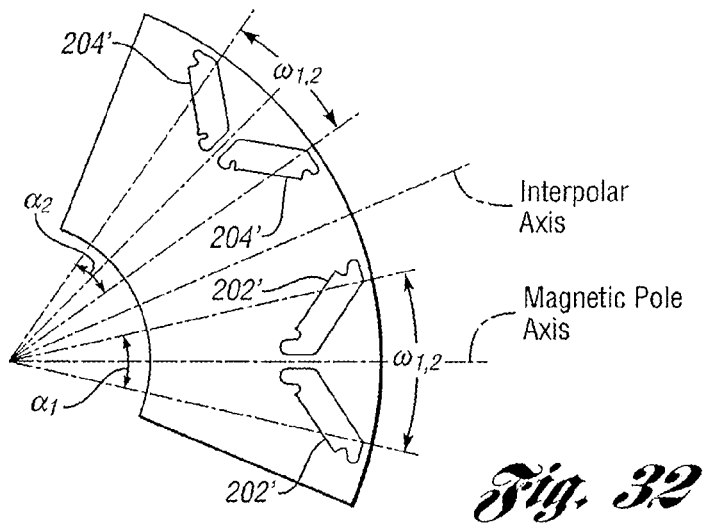
FIG. 32 is a view of the design of the present embodiment of the invention with different pole arc angles.

In the design of the embodiment of the present invention, seen in FIG. 32, the pole arc angle of the first pole is $\alpha_1$ and the pole arc angle of the second pole is $\alpha_2$. The openings for the magnets are shown at 202' and 204'. The values for $\alpha_1$ and $\alpha_2$ are not the same. The magnet included angles in FIG. 32 may be the same or different. If they are different, one included angle of a pair of magnets may be $\omega_1$, and the other included angle of an adjacent pair may be $\omega_2$, or vice versa. Therefore, the symbol $\omega_{1,2}$ is used to designate the included angles.

In FIG. 32, adjacent pairs of magnets have different arc angles $\alpha_1$ and $\alpha_2$. In contrast, the arc angles for adjacent pairs of magnets for the design of FIG. 29 are the same. They are designated as $\alpha_o$ for each adjacent pair.

Figure 31:
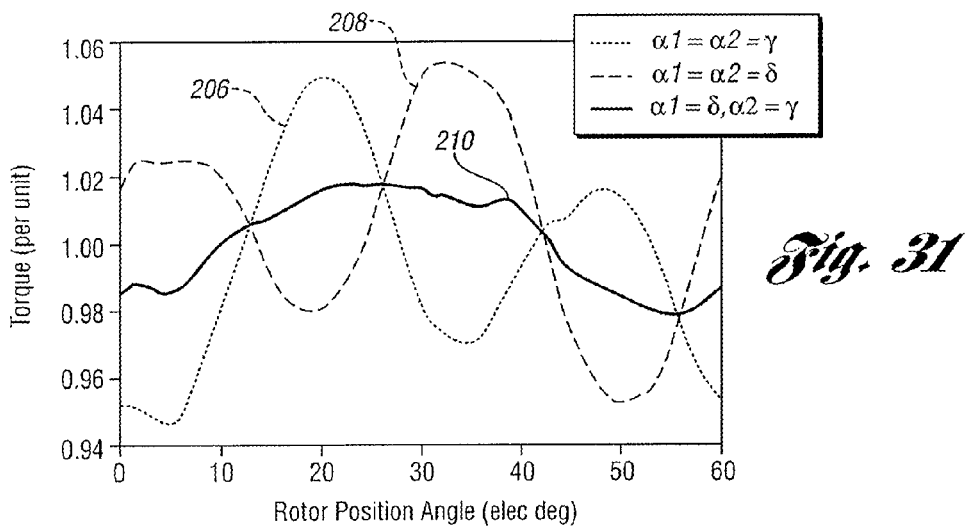
FIG. 31 is a plot showing a torque profile of two conventional designs and the design of the present embodiment of the invention.

The torque profile of the design of FIG. 32 is shown in FIG. 31 at 210. The profile at 210 is the sum of the other two profiles plotted at 206 and 208 in FIG. 31. As expected, the torque ripple produced by the magnetic pole for the first magnet pair is cancelled to a large extent by the torque ripple produced by the second pole.

Figure 33:
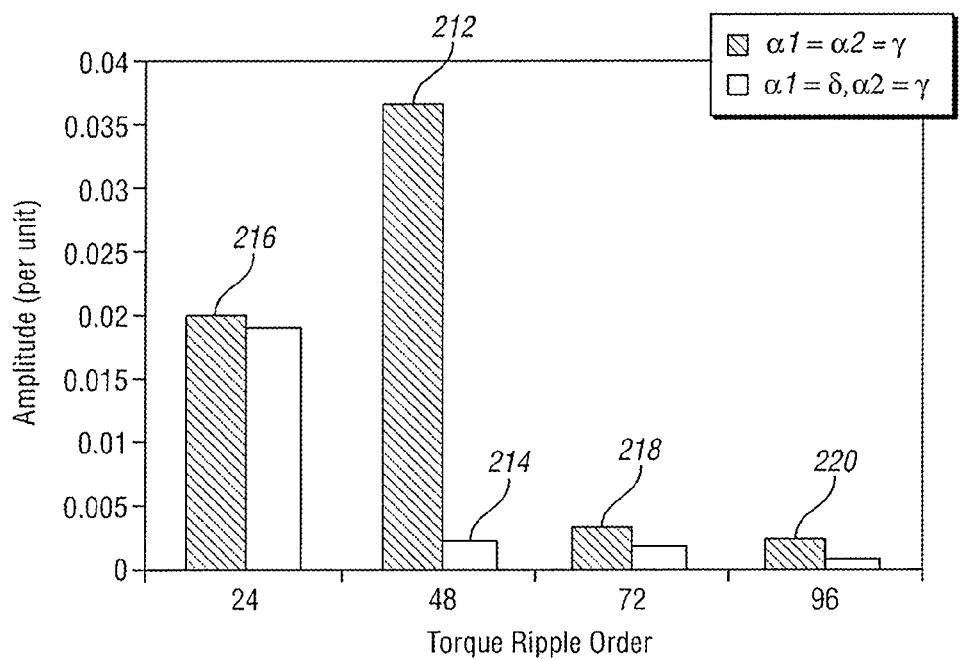
FIG. 33 is a graph showing a comparison of torque ripple components for the present embodiment of the invention relative to other designs.

FIG. 33 shows a comparison of the torque ripple harmonic components of the design of FIG. 29 and the design of FIG. 32. As can be seen at 210 in FIG. 31, the torque ripple of the design of the embodiment of FIG. 32 is significantly reduced. The amplitude of a torque ripple of a mid-range value of torque ripple order (e.g., 48) is shown at 212 in FIG. 33 for the design of FIG. 29. The corresponding torque ripple amplitude for the disclosed embodiment of the invention is shown at 214. For torque ripple of lower order (e.g., 24) seen at 216 and for torque ripple of higher order (e.g., 72 and 96), the difference in amplitudes is less, as shown at 218 and 220, respectively.

In one variation of the design shown in FIG. 32, one arc angle (e.g., $\alpha_1$) for one pair of magnets on one lamination section is different than the arc angle (e.g., $\alpha_2$) for another pair on an adjacent lamination section. Further, one magnet pair may have magnets with a first arc angle and an adjacent magnet pair may have magnets with a different arc angle, both pairs being on the same lamination section. Still further, at least one pair of magnets for one lamination section may have the same arc angle as a different pair of magnets for either the same lamination section or on an adjacent lamination section at a location arcuately spaced from the one pair. The shapes (e.g., the lengths and widths) of the magnets of each pair also can be dissimilar as shown in FIG. 32.

The present invention includes embodiments in which $\alpha_1$ and $\alpha_2$ are in:

(i) in different axially placed lamination sections of the rotor;

(ii) on the same lamination section in a $\alpha_1$-$\alpha_2$-$\alpha_1\alpha_2$ pattern; or (iii) on the same laminations section in a $\alpha_1$-$\alpha_2$-$\alpha_1$-$\alpha_2$ pattern; or (iv) the same as (ii) or (iii), but with two axially placed sections so that an $\alpha_1$ magnet pair is placed (or stacked) on an $\alpha_2$ magnet pair.

There are other possible arrangements of pole arc angles. For example, for an 8-pole motor, the first and third pole pairs can have a pole arc angle $\alpha$, and the second and fourth pole pairs can have a different pole arc angle. In general, each pole pair can have its own pole arc angle. The values of the pole arc angles are determined by the design optimization that minimizes the torque ripple.

Although embodiments of the invention have been disclosed, it will be apparent to persons skilled in the art that modifications may be made without departing from the scope of the invention.

What is claimed:

1. A permanent magnet machine comprising:
a stator; and
a rotor,
the rotor having a plurality of pairs of permanent magnets on its periphery,
the magnets of each pair being located in a "V" shape configuration defining an angle therebetween,
the rotor comprising laminations arranged in multiple sections in stacked axial relationship, and
the magnets of one pair for one section defining an arc angle therebetween that differs from an angle defined by another pair of magnets of the same rotor section to manipulate harmonic components of rotor torque to obtain smooth torque production.

2. The permanent magnet machine set forth in claim 1 wherein the magnets have pre-calculated lengths and widths, the width of the magnets in one section being different than a corresponding width of magnets of another section.

3. The permanent magnet machine set forth in claim 1 wherein the length of magnets in one section is different than the length of magnets of another section.

4. The permanent magnet machine set forth in claim 1 wherein the magnets of each pair define a magnetic axis,
the rotor having at least two rotor sections arranged in axially-stacked relationship, each rotor section having a plurality of laminations in stacked assembled relationship, and
the magnetic axis of one rotor section being in axial alignment with the magnetic pole axis of an adjacent magnet pair in an adjacent rotor section, the magnet pairs having different arc angles.

5. A permanent magnet machine comprising a stator and a rotor;
the rotor having laminations arranged in axially-stacked relationship, and a plurality of sets of permanent magnets disposed in the laminations, each of the sets having at least two magnets; and
at least one of the sets having an arc angle that differs from an arc angle defined by another of the sets to manipulate harmonic components of rotor torque to obtain smooth torque production.

6. The permanent magnet machine set forth in claim 5 wherein the laminations are arranged in multiple, axially stacked sections, one magnet of the at least one of the sets being placed in one section and the other magnet of the at least one of the sets being placed in an adjacent section.

7. The permanent magnet machine set forth in claim 5 wherein the magnets are arranged in V-shaped pairs that define magnet included angles, the included angle of the magnets of one pair being different than the included angle of another pair.

8. The permanent magnet machine set forth in claim 5 wherein the magnets are arranged in V-shaped pairs that define magnet included angles, the included angle of the magnets of one pair being equal to the included angle of another pair.

9. A permanent magnet machine comprising a stator with electromagnetic windings for stator poles and a rotor located on a rotor axis that is common to an axis for the stator with an air gap between the stator and the rotor;
the rotor having a plurality of sets of permanent magnets on its periphery, each set having at least two magnets;
the rotor having laminations arranged in axially-stacked relationship, the magnets being placed in the laminations;
magnetic poles for the magnet sets being characterized by flux flow patterns that interact with flux flow patterns for the electromagnetic stator windings to create rotor torque; and
at least one magnet set having an arc angle that differs from an arc angle defined by another magnet set whereby harmonic components of rotor torque are manipulated to obtain smooth torque production.

\* \* \* \* \*